United States Patent [19]

Johnson

[11] Patent Number: 5,014,641
[45] Date of Patent: May 14, 1991

[54] HAZARD WARNING DEVICE FOR VEHICLES

[76] Inventor: William M. Johnson, P.O. Box 70404, Eugene, Oreg. 97401

[21] Appl. No.: 580,126

[22] Filed: Sep. 10, 1990

[51] Int. Cl.[5] .......................... B60Q 1/26; G02B 5/12
[52] U.S. Cl. .................................... 116/28 R; 116/30; 248/534; 350/99; 446/217
[58] Field of Search ................ 40/412, 413, 440, 441; 116/28 R, 30, 173, 264, 265; 248/230, 534, 541; 350/97, 99; 446/217–219

[56] References Cited

U.S. PATENT DOCUMENTS

| | | | |
|---|---|---|---|
| 3,757,730 | 9/1973 | Douglas | 116/28 R |
| 3,758,190 | 9/1973 | Douglas | 350/97 |
| 3,950,701 | 4/1976 | Matuoka et al. | 325/312 |
| 3,961,811 | 6/1976 | Brilando et al. | 280/229 |
| 4,105,286 | 8/1978 | Curran | 350/99 |
| 4,120,561 | 10/1978 | Burkholder | 350/99 |
| 4,194,809 | 3/1980 | Campagna, Jr. | 350/97 |
| 4,204,746 | 5/1980 | Fisher | 350/99 |
| 4,326,774 | 4/1982 | Beigl | 350/307 |
| 4,605,289 | 8/1986 | Levine et al. | 350/606 |
| 4,715,681 | 12/1987 | Johnson | 350/99 |
| 4,826,306 | 5/1989 | Grissen et al. | 350/632 |

FOREIGN PATENT DOCUMENTS

| | | | |
|---|---|---|---|
| 0014986 | 9/1980 | European Pat. Off. | 350/97 |
| 0619548 | 3/1949 | United Kingdom | 350/99 |

*Primary Examiner*—William A. Cuchlinski, Jr.
*Assistant Examiner*—W. Morris Worth
*Attorney, Agent, or Firm*—Eugene M. Eckelman

[57] ABSTRACT

A body portion is supported in upright position by a support stem and has wind propelling blades arranged to rotatably drive the body portion when subjected to air currents. The body portion has front and rear surfaces one of which may support a rear view mirror and the other of which may support a reflector. The body portion has a lock nut for holding it stationary on the stem, for allowing rotation thereof when released. The body portion has forward and rearward as well as lateral adjustable positioning on the stem, and the stem has lateral positioning on a bracket that mounts it on a vehicle.

7 Claims, 1 Drawing Sheet

HAZARD WARNING DEVICE FOR VEHICLES

BACKGROUND OF THE INVENTION

This invention relates to new and useful improvements in hazard warning devices for vehicles such as bicycles, tricycles, wheelchairs, ATV's farm machinery, etc.

The inherent danger to bicyclists and a number of other vehicles is well known and prior devices have been conceived to attract attention to them. As an example, bicyclists have used a brightly colored flag on top of a flexible rod affixed to the bicycle which sways back and forth or sideways. Some devices provide reflectors that designate a slow moving vehicle and are particularly visible at night. Also, wind actuating devices are known that have reflecting and fluorescent material for providing eye-catching attention.

Bicycles and other slow moving vehicles also have been provided with rear view mirrors so that the cyclists can monitor approaching motor vehicles. These rear view mirrors are mounted on the bicycle, either permanently or in a snap-on arrangement, and in order to be effective they must extend laterally a sufficient distance to provide a rear image for the cyclists. These prior devices have a serious disadvantage in that they are difficult or impossible to adjust to the cyclist and furthermore are not laterally adjustable so as to be movable between a use position and a retracted position.

SUMMARY OF THE INVENTION

According to the present invention and forming a primary objective thereof, a hazard warning device is provided for vehicles that possesses improvements in structure and function over prior hazard devices.

A more particular object is to provide a device of the type described that is structured so that it is capable of serving as a hazard warning device and/or a rear view mirror.

Other objects are to provide such a device that is highly visible in both of its functions as a warning device and a rear view mirror; and that has novel adjustments of a supporting stem for the device on the vehicle as well as novel adjustments of the hazard device on the stem.

The invention will be better understood and additional objects and advantages will become apparent from the following description taken in connection with the accompanying drawings.

DETAILED DESCRIPTION OF PREFERRED EMBODIMENTS

Figure 1:
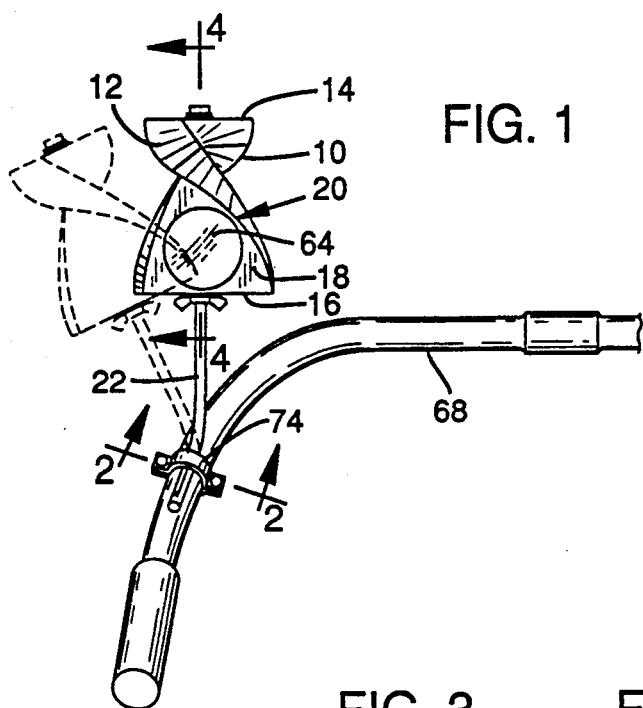
FIG. 1 is a perspective view of the device taken from a rearward point and showing the device mounted on the handlebars of a bicycle.
Figure 4:
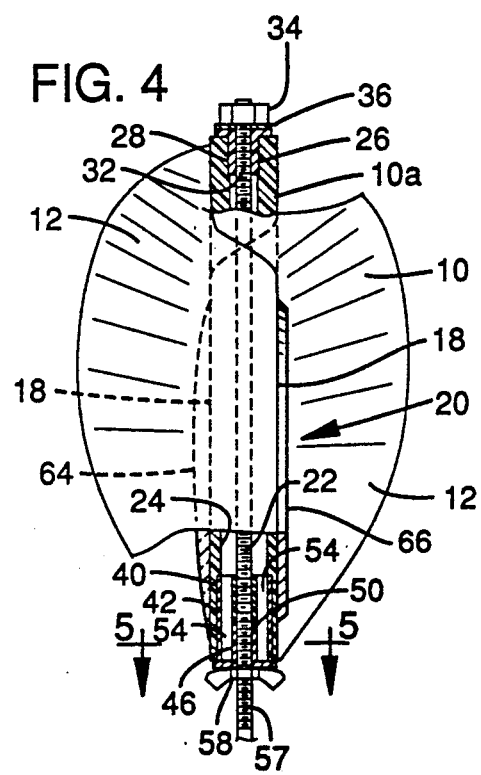
FIG. 4 is an enlarged cross sectional view taken on the line 4—4 of FIG. 1.

The device employs a body portion or head 10 having two opposite and symmetrical wind propelling blades 12 that taper from the top 14 to a wider center portion, FIGS. 1 and 4, and then taper to a point at bottom 16 when viewed from an edge of the head. As viewed from the front or rear, FIG. 1, body portion 10 below the vertical center is also widened toward the bottom and each of the front and rear sides in this widened portion comprises a flat surface 18. As viewed in edge relation, and as best seen by the section view of FIG. 4, body portion 10 in its central area 10a between the side edges is rectangular in configuration. The blades 12 in defining the upper right sides of the flat surfaces 18 form wind pocket areas 20 which contribute to efficient rotation of the body portion.

Body portion 10 is supported on an upright stem 22, and for this purpose it has an axial bore 24 through which the stem rotatably passes. The stem is rotatably journaled in an upper bushing 26 mounted fixedly in a counterbore 28 in the body portion. The upper end of the stem receives a lock cap 34 and friction free washer 36.

Figure 5:
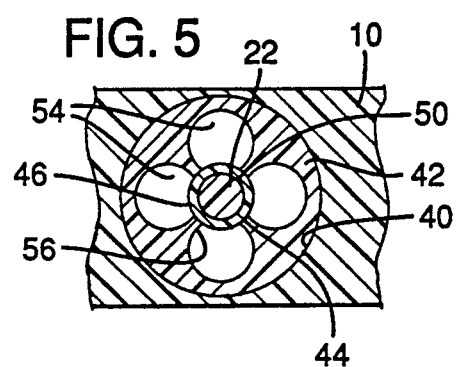
FIG. 5 is an enlarged sectional view taken on the line 5—5 of FIG. 4.

The lower end of the body portion 10 has a counterbore 40, best seen in FIG. 5, which fixedly receives a bushing receptacle 42 having a central bore 44 which receives a sleeve 46, the central bore 50 of which provides rotatable journaled engagement for the stem 22. Bushing receptacle 42 has a plurality of upright pockets 54 that communicate laterally with its bore 44. These upright pockets have a throat or reduced portion 56 relative to the diameter of the sleeve 46 whereby upon tipping the body portion 10 forward or rearwardly or laterally, it will snap into one of the pockets and change the angle of the body portion on the stem. As apparent in FIG. 5 wherein four equally spaced pockets are provided, the body portion can be adjusted to three positions in forward and reverse and three positions laterally, namely, a central position and one forward or rearward or on each side thereof, for a purpose to be explained more fully hereinafter.

The portion 57 of the stem adjacent the lower end of the body portion is threaded and receives a wing nut 58. By tightening the nut 58, the body portion 22 can be clamped non-rotatably on the stem and upon loosening the nut the body portion can rotate freely. Wing nut 58 provides quick release and locking of the body portion on the stem.

In a preferred arrangement one of the flat surfaces 18 can be provided with a rear view mirror 64 and the opposite surface can be provided with a reflector 66. It is to be understood, however, that two mirrors may be used or two reflectors, or any other arrangement of mirrors or attention getting devices.

Figures 2, 3:
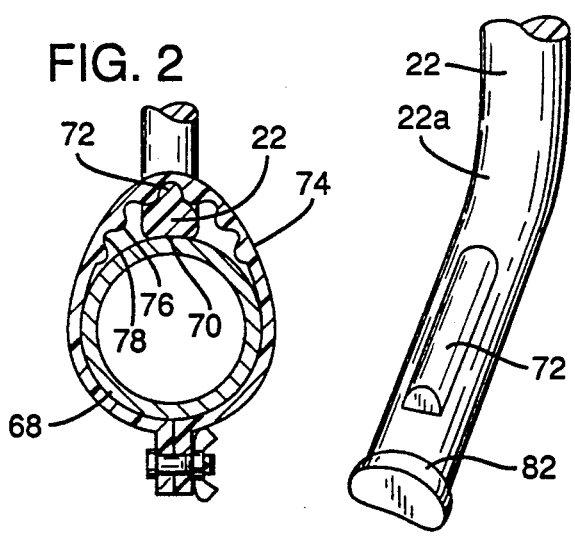
FIG. 2 is an enlarged cross sectional view taken on the line 2—2 of FIG. 1.
FIG. 3 is a fragmentary view of a lower portion of a mounting stem for the device.

One or more of the present devices may be mounted at any place or places on a slow moving or light vehicle such as bicycles, tricycles, wheelchairs, ATV's, farm machinery, etc. When used for bicycles, it preferably is mounted on the handlebars 68, although it can as well be mounted on other frame parts including rear portions of the frame. For this purpose and for mounting on other circular members, and with reference to FIGS. 1-3, the lower end of the stem 22 has a slight curvature 22a and this lower end has a dished bottom surface 70 arranged to seat firmly on the handlebars in contoured relation. An integral spline 72 is provided on the upper surface adjacent the lower end of the stem and is arranged for cooperation with a clamp 74 that circles the handlebar and stem 22 at the spline. In a preferred structure, the clamp has a plurality of rounded inwardly facing ribs or bumps that form pockets 78 therebetween that engage the spline in an arrangement such that the stem can be adjusted angularly from one side to the other by merely pushing it over at an upper portion thereof and forcing the spline over to a selected pocket 78. By this structure, the device can be adjusted laterally to the cyclist.

Figure 6:
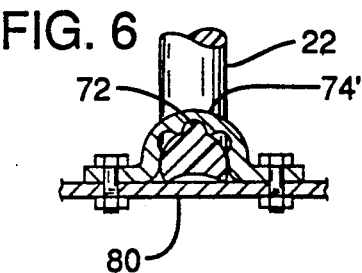
FIG. 6 is a sectional view taken similar to FIG. 2 but showing an alternative manner of mounting the present hazard warning device on a vehicle.

FIG. 6 illustrates an arrangement wherein a clamp 74' is of a shape to mount the stem on a surface 80 which is other than a handlebar. Such illustrates a concept wherein the device can be mounted on any other type of surface or frame such as a wheelchair or farm machinery.

The body portion 10 is fluorescent, either comprising fluorescent plastic or having painted surfaces, so as to readily attract attention day or night. In the use of the present hazard warning device, it is readily attached into place and adjusted. Such adjustment can comprise the angular disposition of the stem in the bracket 74 by forcing the stem over so that its spline 72 engages a selected pocket 78 in the clamp 74. Such adjustment can be in the center or to each side. Also, the body portion 10 can be tipped forward, rearward, sideways relative to the stem by forcing the bushing 48 into a selected one of the pockets 54 in the bushing receptacle 42. Such adjustment comprises a fine movement for the cyclist to align the rear image up in the rear view mirror 64 or for any other reason.

When the device is to be used as a rear view mirror, the wing nut 58 will be tightened so as to anchor the body portion 10 non rotatably. This device when mounted on a bicycle or other vehicle will by its bright color attract attention of vehicles or the like. When it is desired to attract greater attention, the wing nut 58 is loosened and the device will rotate from wind currents developed by forward movement of the vehicle. The two blades 12 that extend in a curvature down the one side of the flat surfaces 18 provide efficient wind catching pockets 20 and the device will rotate freely even at slow speeds. The device, due to the shape of the blades 12 and surfaces 18, will rotate efficiently in any position, including an upright position, an inverted position, and horizontal position including forwardly facing, rearwardly facing and obliquely. The device can by rotation of the stem in the bracket 74 be positioned so as to be out of the way when the vehicle is not in use. Also, the stem can be removed from the bicycle by first loosening the bracket 74 a small amount and pulling the stem endwise out of engagement with the bracket. To insure against accidental and unauthorized displacement, the free end of the stem has an enlargement 82 that will lock the stem in place whenever the bracket is tightened.

It is to be understood that the forms of my invention herein shown and described are to be taken as preferred examples of the same and that various changes in the shape, size and arrangement of parts may be resorted to without departing from the spirit of my invention, or the scope of the subjoined claims.

Having thus described my invention, I claim:

1. A hazard warning device for vehicles comprising:
    a body portion having upper and lower ends and opposite side surfaces,
    a support stem having means for supporting said body portion rotatably and arranged for attachment to a vehicle,
    blade means on said body portion arranged to rotatably drive said body portion when subject to air currents,
    a rear view mirror on one of said side surfaces, and a reflector on the opposite side surface, wherein the support means includes locking means movable between a first position allowing free rotation of said body portion and a second position clamping said body portion in a stationary non-rotative condition.

2. The hazard warning device of claim 1 wherein the support means includes means for providing between said stem and said body portion provides angular adjustment of said body portion relative to the stem.

3. The hazard warning device of claim 1 wherein the support means includes means for providing angular adjustment of said body portion in forward and rearward as well as lateral directions relative to the stem.

4. The hazard warning device of claim 1 including a mounting bracket arranged to mount said stem to the handlebars of a vehicle, and adjustment means on said stem and bracket providing upright angular adjustment of said stem to one side or the other.

5. The hazard warning device of claim 4 wherein said adjustment means comprises spline means on one of said stem and mounting bracket and pocket means on the other of said stem and mounting bracket whereby the upright angular adjustment of said stem is controlled by selected snap-in engagement of said spline means with said pocket means.

6. The hazard warning device of claim 1 wherein said body portion is constructed of fluorescent plastic.

7. The hazard warning device of claim 2 wherein said body portion includes an upper and a lower bushing receiving said stem for rotation, said lower bushing being received in a bushing receptacle having a central vertical opening therethrough for receiving said lowering bushing in a center upright position and also having forward, rearward and laterally spaced vertical openings arranged to receive said lower backing snap-in engagement for tilting said stem angularly relative to the vertical.

* * * * *